United States Patent [19]

Schmidt

[11] Patent Number: 4,786,081
[45] Date of Patent: Nov. 22, 1988

[54] VERTICALLY ADJUSTABLE MOTOR-VEHICLE SAFETY-BELT MOUNT

[76] Inventor: Gudrun Schmidt, Dr. Paul-Müller-Str. 36, D-5940 Lennestadt 11, Fed. Rep. of Germany

[21] Appl. No.: 58,264

[22] Filed: Jun. 4, 1987

[30] Foreign Application Priority Data

Jun. 5, 1986 [DE] Fed. Rep. of Germany ....... 3618973
Jun. 26, 1986 [DE] Fed. Rep. of Germany ....... 3621380
Mar. 17, 1987 [DE] Fed. Rep. of Germany ....... 3708564

[51] Int. Cl.$^4$ .......................................... B60R 22/20
[52] U.S. Cl. .................................. 280/808; 297/483; 248/297.3
[58] Field of Search .............. 280/801, 808; 297/483, 297/468; 248/297.3, 295.1, 243

[56] References Cited

U.S. PATENT DOCUMENTS

Re. 32,524 10/1987 Temple ............................... 280/808
615,809 12/1898 Covert .............................. 248/297.3
1,657,939 1/1928 Rockwell ......................... 248/297.3
4,398,749 8/1983 Hipp et al. ........................... 297/483

FOREIGN PATENT DOCUMENTS 45159 2/1974 United Kingdom ................ 248/243

Primary Examiner—John J. Love
Assistant Examiner—Karin L. Ferriter
Attorney, Agent, or Firm—Herbert Dubno; Ronald Lianides

[57] ABSTRACT

An adjustable mount for anchoring a safety belt on a vertical surface of a motor vehicle has a vertically elongated guide rail fixed to the surface and having an front face turned away from the surface and a rear face turned toward the surface. This rail is formed with a longitudinally extending throughgoing slot and generally along the full length of the slot with a vertical row of stops at the rear face and having upwardly and downwardly directed stop edges. A slider displaceable along the rail has a rear portion engageable forward with the rear face of the rail and having abutments engageable between the stops with the edges thereof, a front portion engageable rearward with the front face of the rail, and an intermediate connecting portion extending between and unitarily interconnecting the front and rear portions. A guide fixed to the rear portion extends forward therefrom through the slot and is formed with a forwardly open threaded bore into which a bolt is threaded. A spring braced between one of the faces and the slider urges the rear portion forward against the rear face. This rear portion is displaceable rearward on loading of the spring to a position with the abutments clear of the stops and with the slider displaceable longitudinally along the slot. A buckle traversed by the belt is mounted on the slider.

16 Claims, 6 Drawing Sheets

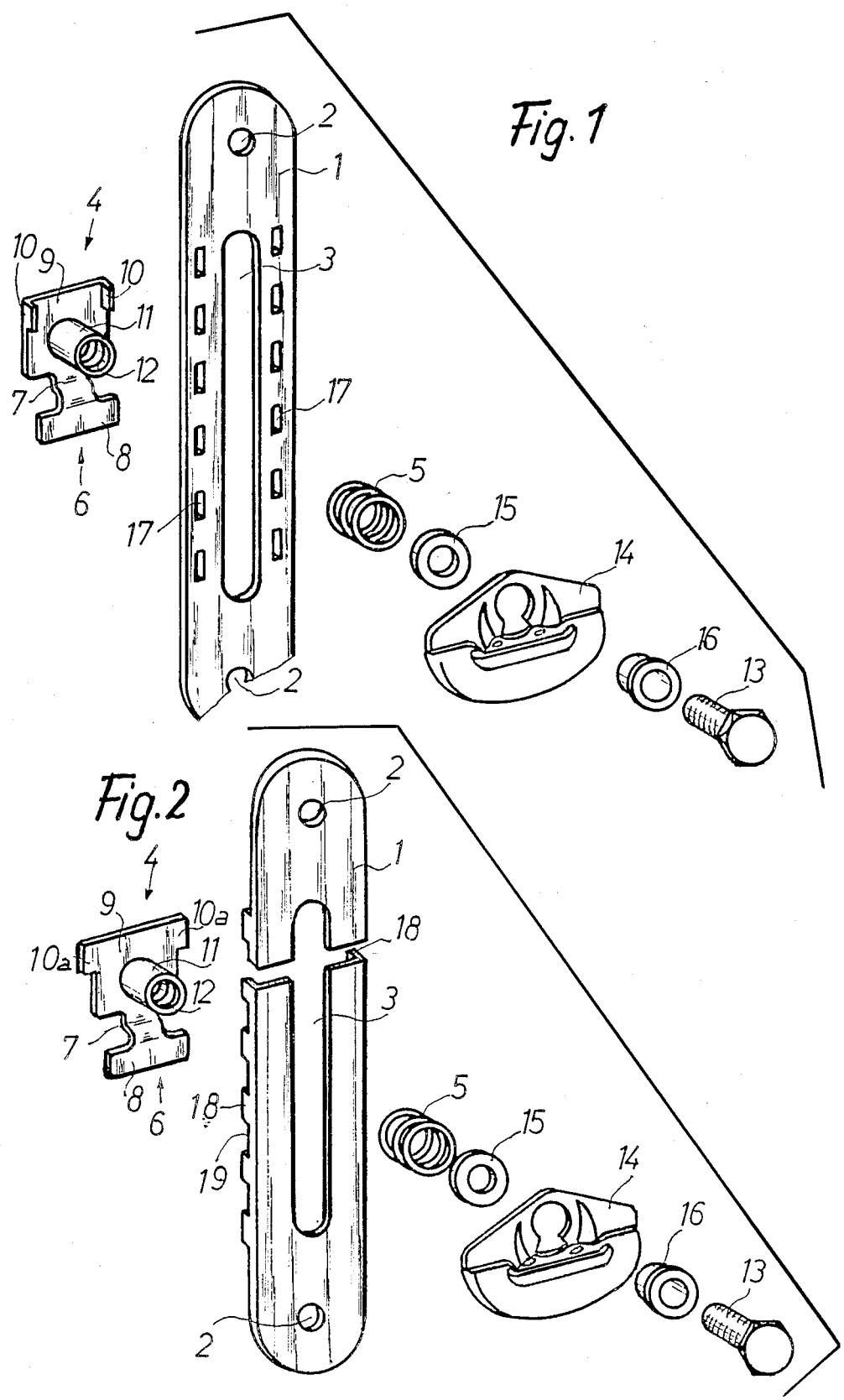

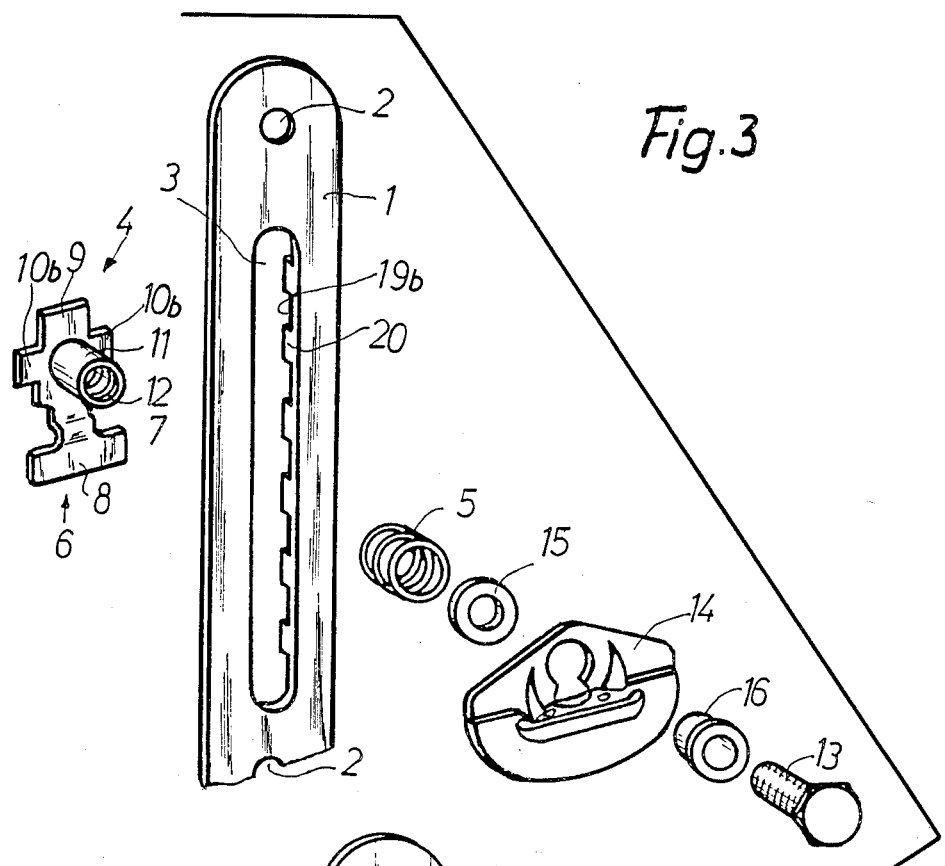
Fig. 3
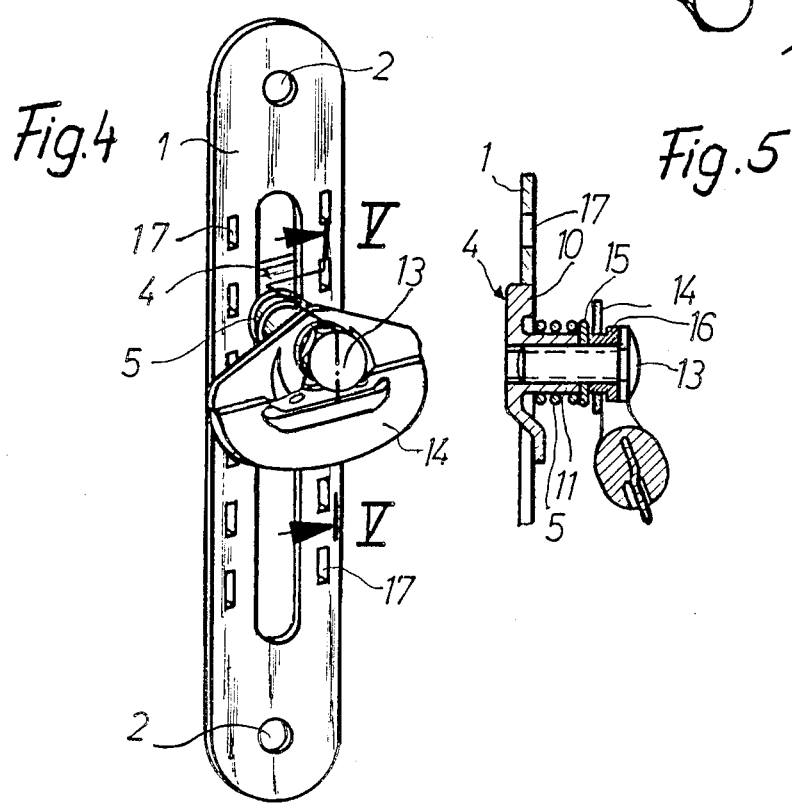
Fig. 4
Fig. 5

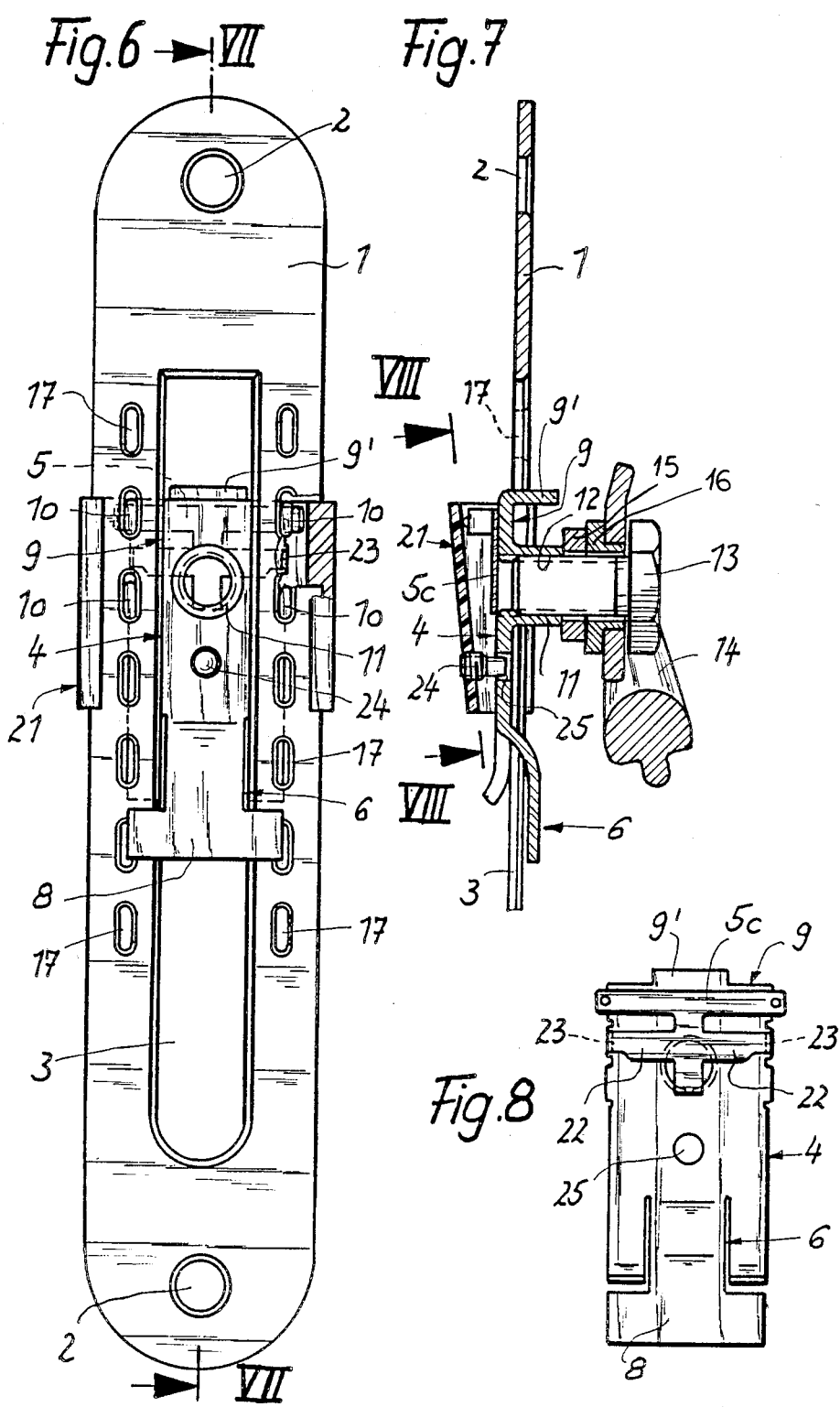

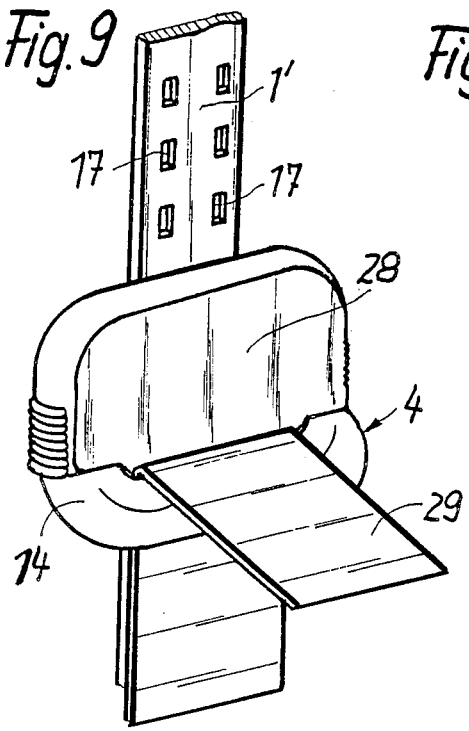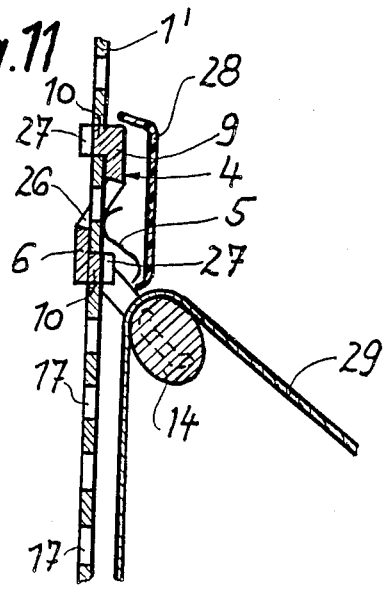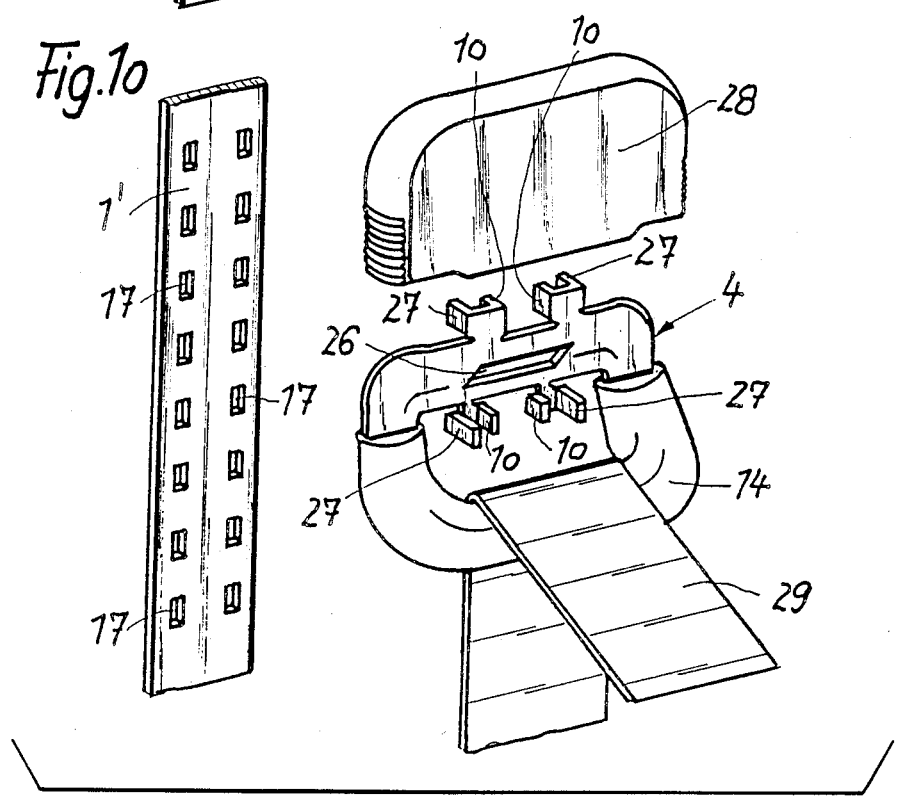

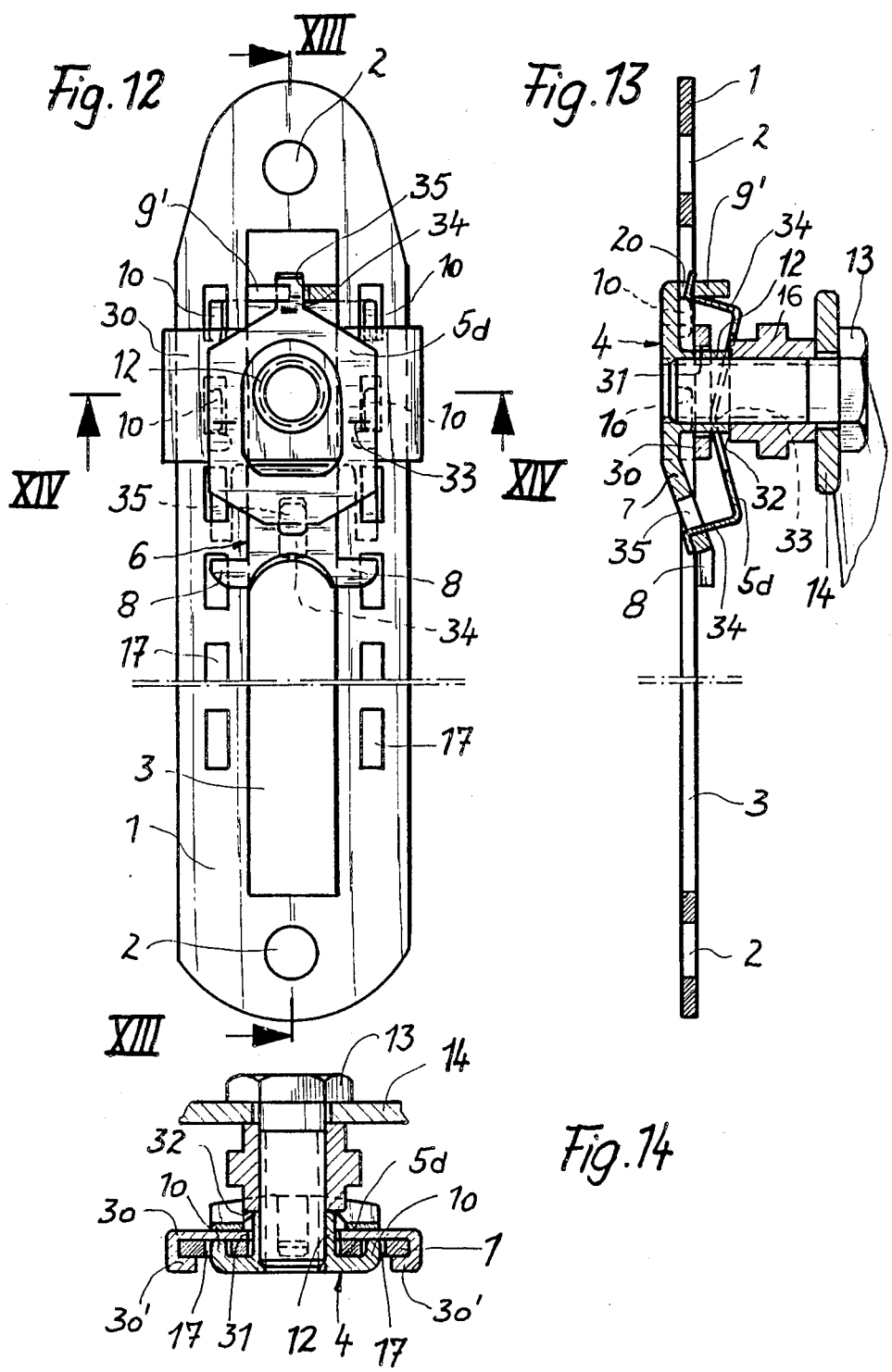

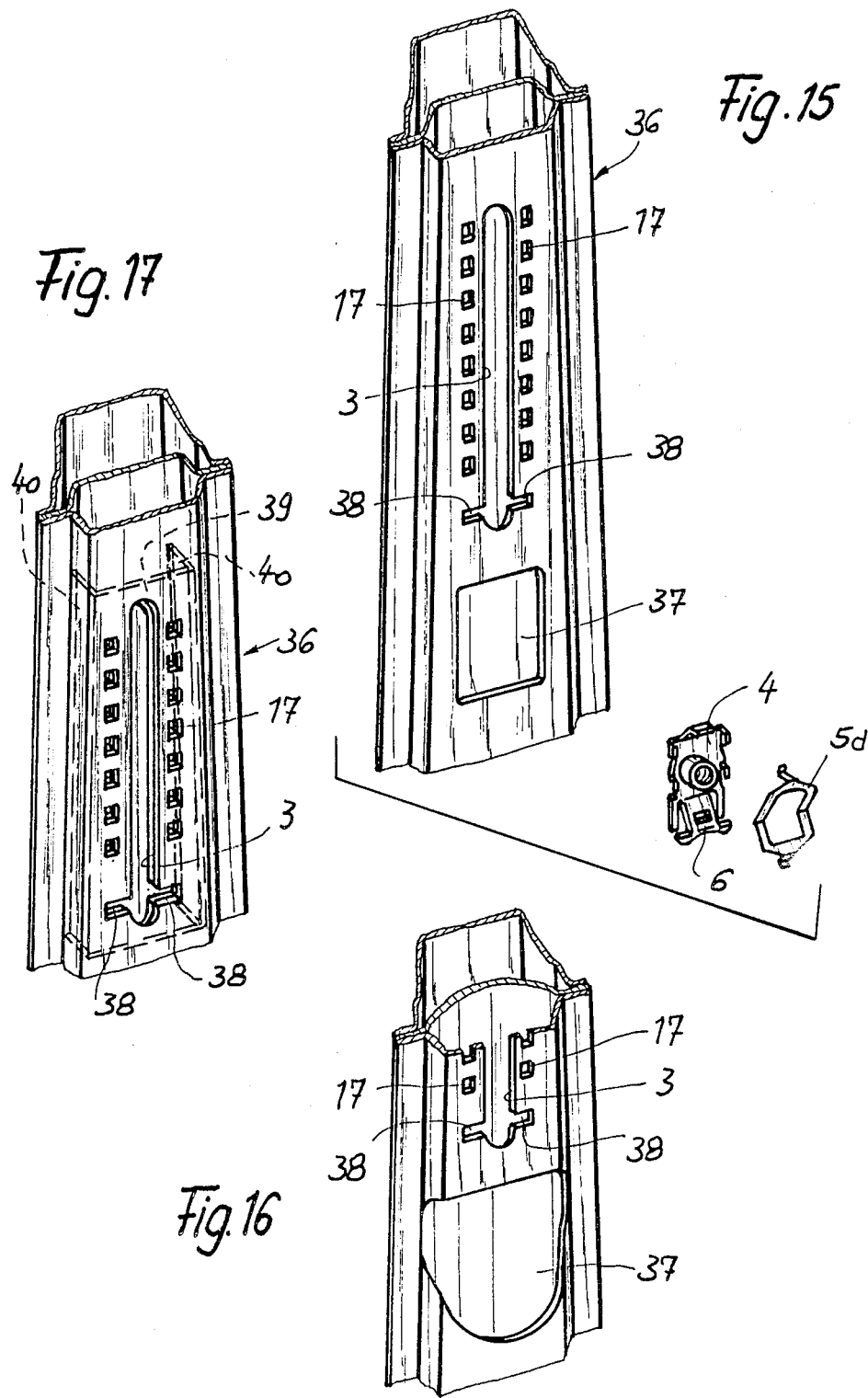

VERTICALLY ADJUSTABLE MOTOR-VEHICLE SAFETY-BELT MOUNT

FIELD OF THE INVENTION

The present invention relates to a vertically adjustable mount for a motor-vehicle safety belt. More particularly this invention concerns such a mount through which the shoulder belt passes between the winder and the passenger.

BACKGROUND OF THE INVENTION

An adjustable mount for anchoring a safety belt on a vertical surface of a motor vehicle typically has a vertically elongated guide rail fixed to the surface and having a front face turned away from the surface and a rear face turned toward the surface. The rail is formed with a longitudinally extending throughgoing slot and with a row of stops. A slider displaceable along the rail has a guide extending forward through the slot and formed with a forwardly open threaded bore receiving a bolt. A spring braced between one of the faces and the slider urges the slider into engagement with the stops and a buckle traversed by the belt is mounted on the bolt.

In this type of fitting the rail has stops cut into the longitudinal rail edge, the portions of the rail between the stops being bent back. The slider is as an elliptical-section tube formed by two welded-together pieces of sheet metal. This tube has a major axis greater than the width of the rail and a minor axis equal at least to the front-to-back thickness of the rail including that of the portions bent back between the stops.

The slider is formed with abutments complementary to the stops and is provided internally with a synthetic-resin bushing facilitating sliding movement along the rail. A leaf spring is braced between the rail and the slider to push it transversely such that the stops engage between the abutments and the slider and rail cannot move relative to each other longitudinally. Compression of this leaf spring allows the stops and abutments to be disengaged from each other and the slider can then be moved along the rail.

Such a piece of equipment is relatively complex and expensive to manufacture. In addition if the slider is accidentally pushed past the end of the row of stops, it will make accurate setting impossible and even allow the slider to slip when tension is exerted on the belt.

OBJECTS OF THE INVENTION

It is therefore an object of the present invention to provide an improved adjustable motor-vehicle safety-belt mount.

Another object is the provision of such an adjustable motor-vehicle safety-belt mount which overcomes the above-given disadvantages, that is which is easy and inexpensive to manufacture and safe and robust in operation.

SUMMARY OF THE INVENTION

An adjustable mount for anchoring a safety belt on a vertical surface of a motor vehicle has according to the invention a vertically elongated guide rail fixed to the surface and having an front face turned away from the surface and a rear face turned toward the surface. This rail is formed with a longitudinally extending throughgoing slot and generally along the full length of the slot with a vertical row of stops at the rear face and having upwardly and downwardly directed stop edges. A slider displaceable along the rail has a rear portion engageable forward with the rear face of the rail and having abutments engageable between the stops with the edges thereof, a front portion engageable rearward with the front face of the rail, and an intermediate connecting portion extending between and unitarily interconnecting the front and rear portions. A guide fixed to the rear portion extends forward therefrom through the slot and is formed with a forwardly open threaded bore into which a bolt is threaded. A spring braced between one of the faces and the slider urges the rear portion forward against the rear face. This rear portion is displaceable rearward on loading of the spring to a position with the abutments clear of the stops and with the slider displaceable longitudinally along the slot. A buckle traversed by the belt is mounted on the slider.

Thus the slider can tip about an axis parallel to the front and back faces of the rail but perpendicular to the longitudinal extent of the rail between a position with the stops and abutments engaging and another position out of such engagement. Any pull on the slider will inherently be exerted in the forward direction so as to pull the abutments and stops into engagement. Only when the belt is completely slack can the slider be pushed in and then slid along the slot. Since the row of stops extends the full length of this slot, at no place can the abutments hang up and not catch in at least one stop. The mount according to the invention therefore basically is only formed of three parts: the slider, the spring, and the rail. The slider itself is of very simple construction so that it can be made quite cheaply.

According to another feature of this invention the front portion of the slider is below the rear portion thereof. Since the normal pull on the slider from the belt is downward, this ensures good self-locking action.

Furthermore according to this invention the slot is of a predetermined transverse clear width and the slider is of a generally uniform thickness that is much smaller than the slot width. The intermediate portion extends through the slot and the front portion is wider than the slot. Furthermore the guide is an internally threaded sleeve fixed to the rear portion and the stops either are teeth projecting rearward from the rear face or holes opening at the rear face. Such construction is extremely simple, easy to manufacture, and robust.

In another arrangement according to this invention there is a spacer on the bolt and the spring is braced between the spacer and the front face to minimize wear on the spring as the slider is moved on the rail. The system can also have a support spaced rearward from the slider and engaged forward around the rail with the spring braced between the support and the slider. In this latter case the spring is a leaf spring. This slider can have a rearwardly open recess and the support can have a coupling element projecting forward from the support into the recess so that the element couples the support to the slider for joint longitudinal movement.

The rear portion of this invention is guided in the rail by a forwardly bent tab projecting into the slot. In addition the slider is formed between its portions with an aperture through which the rail extends and the intermediate portion extends around the rail at the aperture, there being no slot, threaded guide, or bolt. In this arrangement the stops are throughgoing holes open at both the front and rear faces and the slide is provided on its front portion with rearwardly projecting abutments engageable rearward in the holes. These abutments project forward into the holes. In addition in this arrangement the front portion is above the rear portion and the buckle is a loop integrally formed with the rear portion. This gives excellent self-locking action. Such a device can further have a guide member directly juxtaposed with the front face of the rail, traversed by the guide, and engaging backward around longitudinal edges of the rail. Here the spring is braced between the guide member and the slider. Furthermore the spring is a leaf spring having one end hooked in the rear portion, an opposite end hooked in the front portion, and an intermediate portion bearing backward on the guide member.

In accordance with a further feature of this invention the rail is formed by a hollow beam of the motor-vehicle frame which is formed longitudinally offset from the slot with a service aperture capable of passing the slider. In addition the beam is formed at a longitudinal end of the slot with a transverse widening through which the front portion can pass and can have a reinforcing plate formed with the slot and lying against a inner surface of the beam.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 1 is an exploded perspective view of a first embodiment of the adjustable mount according to this invention;

FIGS. 2 and 3 are views like FIG. 1 of variations on the system of FIG. 1;

FIG. 4 is an assembled perspective view of the first embodiment of the mount;

FIG. 5 is a longitudinal section taken along line V—V of FIG. 4;

FIG. 6 is a partly sectional front view of a second embodiment of the mount according to the invention;

FIG. 7 is a longitudinal section taken along line VII—VII of FIG. 6;

FIG. 8 is a rear view of the slider and spring taken along line VIII—VIII of FIG. 7;

FIG. 9 is a perspective view of a third embodiment of a mount according to the invention;

FIGS. 10 and 11 respectively are exploded perspective and longitudinally sectional views of the mount of FIG. 9;

FIG. 12 is a front elevational view of a fourth embodiment of a mount according to the invention;

FIGS. 13 and 14 respectively are longitudinal and transverse sections taken along lines XII—XII and XIV—XIV of FIG. 12;

FIG. 15 is a perspective view of a rail, slider, and spring according to the invention; and FIGS. 16 and 17 are perspective views of variations on the rail of FIG. 15.

SPECIFIC DESCRIPTION

As seen in FIGS. 1, 4, and 5 a seat-belt mount according to this invention has a vertically elongated sheet-steel rail 1 having at its upper and lower ends holes 2 for bolting it to the inside of a door post or the like. The rail 1 is formed with a longitudinal slot 3 occupying about one-third of its width up the center and is formed with throughgoing stop holes 17 in rows flanking the slot 3 and with the holes 17 being level with one another to opposite sides of the slot 3.

A slider 4 movable along the rail 1 has a front portion 6, a back portion 9, and an intermediate portion 7 joining them. The intermediate portion 7 is slightly narrower than the slot 3 and the front portion 6 has tabs 9 that project transversely beyond the longitudinal edges of this intermediate portion 7. Normally the front portion 6 bears with its tabs 8 back against the front face of the rail 1, that is the face turned toward the right in FIG. 5, and the rear part 9 bears forward against the back face of the rail 1, with the intermediate portion 7 extending at an angle between the portions 6 and 9 through the slot 3. The upper corners of the rear portion 9 are turned forward to form abutment tabs 10 that are complementary to and engageable in the holes 17 as seen in FIG. 5. When thus engaged, obviously, the slider 4 is longitudinally nonmovable on the rail 1.

Welded to the front face of the square rear portion 9 of the slider 4 is a guide tube 11 defining a threaded bore 12. The diameter of this tube 11 is slightly less than the width of the slot 3 and this tube 11 projects completely through the slot 3. A bolt 13 is threaded into the hole 12 and compresses a spring 5 against the front face of the rail 11 to both sides of the slot 3 via a washer 15 and spacer bushing 16. Thus the spring 5 continuously urges the rear portion 9 forward into engagement with the rear face of the rail 1, pushing the abutments 10 into the stop holes 17. A buckle 14 hangs on the spacer bushing 16 so that a safety belt threaded through this buckle 14 can swivel freely about the axis defined by the bolt 13 and tube 11, which axis is perpendicular to the plane of the flat rail 1.

Thus to adjust the position of the slide 4 along the rail 1, one need merely press the bolt 13 toward the rail 1. This will push the abutments 10 back out of whichever of the holes 17 they are engaged in, and allow the slider 4 to be moved longitudinally into a new position. As soon as the backward pressure on the bolt 13 is relaxes, the slider 4 will lock in place again, even if at one or the other extreme end of the rail 1. In an accident any tension on the buckle 14 will inherently be forward, that is to the right in FIG. 5, so that this force will serve to hold the stops 10 and abutments 17 together.

FIG. 2 shows a variant of the arrangement of FIG. 1 wherein the top corners of the rear portion 9 are bent out as abutment tabs 10a and the outer longitudinal edges of the rail 1 are bent back to form stop tabs 18 separated by spaces 19. The longitudinal dimension of the tabs 10a is slightly less than that of the spaces 19 for a tight fit.

In FIG. 3, where as in FIG. 2 the same reference numerals are used as in FIG. 1 for identical structure, the rear portion 9 is formed level with the tube 11 with a pair of tabs 10b like the abutment tabs 10a and the edges of the slot 3 are bent in to form tabs 20 delimiting spaces 19b between which the tabs 10b can engage. This arrangement, like that of FIG. 2, functions identically to that of FIGS. 1, 4, and 5.

In FIGS. 6 through 8 the same reference numerals as FIGS. 1 through 5 are used for functionally identical structure. Here a separate guide member 21 is provided which is formed as a C-section synthetic-resin body whose longitudinal edges engage forward around the outer edges of the rail 1, which is generally identical to that of FIG. 1. The slider 4 is integrally formed with the tube 11 which bears directly on the washer 15, and the rear portion 9 of the slider 4 is formed with a forward projection 9' at its upper edge that fits in the slot 3 to guide and center this slider 4.

An arcuate leaf spring 5c has outer ends bearing backward against the guide member 21 and a center bearing forward against the rear face of the upper portion 9 to press it forward against the rail 1 and thereby push two pairs of stops 10 into the holes 17. Projecting downward from this spring 5c is a T-shaped extension 22 having arm ends 23 that engage and hold around the edges of the slider 4, thereby keeping the spring 5c in position thereon. The guide member 21 is provided with an entrainment screw 24 engaging in a hole 25 of the slider 4 to couple this member 21 and the slider 4 for joint longitudinal displacement.

This arrangement is particularly strong. Since there is no rubbing of the spring 5c on the rail 1 its service life is considerably extended. In addition the use of offset pairs of stop tabs 10 means that even if the rail 1 becomes bent, at least two tabs will ensure proper longitudinal coupling between the slider 4 and the rail 1.

In the arrangement of FIGS. 9 through 11, where the same reference numerals as FIGS. 1 through 5 are used for functionally identical structure the rail 1' has no slot 3. Instead the slider 4 is formed with a central passage 26 through which the rail 1' passes. In addition both the front and rear portions 9 and 6 are formed with tabs, respectively projecting backward and forward, engageable in the holes 17, and are also formed with side guide fingers 27 that ride on the longitudinal edges of the rail 1' and keep the slider 4 square thereon.

This slider 4 is provided with a snap-fit synthetic-resin cap 28 against which is braced the spring 5 that presses the rear portion 6 forward. A safety belt 29 is shown looped through the buckle 14. Such a system is extremely simple and durable.

In FIGS. 12 through 14 the same reference numerals as FIGS. 1 through 8 are used for functionally identical structure. Here a C-section front guide member 30 is provided which lies directly against the front face of the rail 1, reaches at 30' around its longitudinal edges, and closely surrounds the integral tube 11 with a central bore 31. The rear end 32 of the spacer 16 bears directly on the front end of the tube 11. A leaf spring 5d has upper and lower ends 34 hooked respectively into holes 20 and 35 in the upper guide tab 9' and the intermediate part 7. This spring 5d is shown flattened, that is it is seeking to pull forward with its ends 34 so as to pull the slider 4 forward and force the guide 30 backward so as to pull the tabs 10 into the holes 17.

Once again in this arrangement the spring 5d is protected from direct contact with the rail 1 to prevent it from being worn out as it the slider 4 is moved therealong.

Finally FIGS. 15 through 17 show a hollow frame beam 36 of a motor vehicle, here functioning as its door post, that is directly formed with the slot 3 and with the stop holes 17. The beam 36 is formed below the slot 3 with a window 37 big enough to fit the slider 4 and spring 5d into it, and the bottom of the slot 3 is formed with a crosswise extension 38 so that he lower portion 6 can be threaded back out to the front. In FIG. 16 an extra-large window 37 is provided to ease assembly, and in FIG. 17 a reinforcement plate 39 having the slot 3 and holes 17 is employed, with flanges 40 of this plate 39 serving to stiffen it. This integration of the rail into he car means that the structure can be made very cheaply and will still be very strong.

I claim:

1. An adjustable mount for anchoring a safety belt on a vertical surface of a motor vehicle, the mount comprising:
    a vertically elongated guide rail adapted to be fixed to the surface and with a front face turned away from the surface and a rear face turned toward the surface, the rail being formed with a longitudinally extending throughgoing slot and generally along the full length of the slot with a vertical row of stops at the rear face and having upwardly and downwardly directed stop edges;
    a slider displaceable along the rail and having
        a rear portion engageable forward with the rear face of the rail and having abutments engageable between the stops with the edges thereof,
        a front portion engageable rearward with the front face of the rail,
        a connecting portion extending between and unitarily interconnecting the front and rear portions;
    a guide fixed to the rear portion, extending forward therefrom through the slot, and formed with a forwardly open threaded bore;
    a bolt threaded into the bore;
    a spring braced between one of the faces and the slider for urging the rear portion forward against the rear face, the rear portion being displaceable rearward on loading of the spring to a position with the abutments clear of the stops and with the slider displaceable longitudinally along the slot; and
    a buckle traversed by the belt and mounted on the slider.

2. The adjustable safety-belt mount defined in claim 1 wherein the front portion of the slider is below the rear portion thereof.

3. The adjustable safety-belt mount defined in claim 1 wherein the slot is of a predetermined transverse clear width and the slider is of a generally uniform thickness that is much smaller than the slot width, the intermediate portion extending through the slot and the front portion being wider than the slot.

4. The adjustable safety-belt mount defined in claim 1 wherein the guide is an internally threaded sleeve fixed to the rear portion.

5. The adjustable safety-belt mount defined in claim 1 wherein the stops are teeth projecting rearward from the rear face.

6. The adjustable safety-belt mount defined in claim 1 wherein the stops are holes opening at the rear face.

7. The adjustable safety-belt mount defined in claim 1, further comprising
    a spacer on the bolt, the spring being braced between the spacer and the front face, the buckle being swivelably mounted on the spacer.

8. The adjustable safety-belt mount defined in claim 1, further comprising
    a support spaced rearward from the slider and engaged forward around the rail, the spring being braced between the support and the slider.

9. The adjustable safety-belt mount defined in claim 8 wherein the spring is a leaf spring.

10. The adjustable safety-belt mount defined in claim 8 wherein the slider has a rearwardly open recess and the support has a coupling element projecting forward from the support into the recess, whereby the element couples the support to the slider for joint longitudinal movement.

11. The adjustable safety-belt mount defined in claim 1 wherein the rear portion has a forwardly bent tab projecting into the slot.

12. The adjustable safety-belt mount defined in claim 1, further comprising
  a guide member directly juxtaposed with the front face of the rail, traversed by the guide, and engaging backward around longitudinal edges of the rail, the spring being braced between the guide member and the slider.

13. The adjustable safety-belt mount defined in claim 12 wherein the spring is a leaf spring having one end hooked in the rear portion, an opposite end hooked in the front portion, and an intermediate portion bearing backward on the guide member.

14. The adjustable safety-belt mount defined in claim 1 wherein the rail is formed by a hollow beam element of the motor-vehicle frame, the beam being formed longitudinally offset from the slot with a service aperture capable of passing the slider.

15. The adjustable safety-belt mount defined in claim 14 wherein the beam is formed at a longitudinal end of the slot with a transverse widening through which the front portion can pass.

16. The adjustable safety-belt mount defined in claim 14, further comprising
  a reinforcing plate formed with the slot and lying against an inner surface of the beam.

* * * * *